United States Patent
Delaney et al.

(10) Patent No.: US 11,102,296 B2
(45) Date of Patent: Aug. 24, 2021

(54) BIG BANG APPROACH IN DATACENTER MIGRATIONS

(71) Applicant: INTERNATIONAL BUSINESS MACHINES CORPORATION, Armonk, NY (US)

(72) Inventors: John Delaney, Kildalkey (IE); Clea Zolotow, Key West, FL (US); Anthony M. Hunt, Hopewell Junction, NY (US); Laxmikantha S. Nanduru, R K Puram Post (IN); Rudolph C. Baron, Kennesaw, GA (US); Florian Graf, Zurich (CH); Dennis M. Carden, Beacon, NY (US); Vladimir V. Danilevich, Calgary (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 614 days.

(21) Appl. No.: 15/966,677

(22) Filed: Apr. 30, 2018

(65) Prior Publication Data
US 2019/0334988 A1 Oct. 31, 2019

(51) Int. Cl.
| | |
|---|---|
| *H04L 12/46* | (2006.01) |
| *H04L 29/08* | (2006.01) |
| *G06F 9/455* | (2018.01) |
| *H04L 29/06* | (2006.01) |

(52) U.S. Cl.
CPC ...... *H04L 67/1097* (2013.01); *G06F 9/45558* (2013.01); *H04L 12/4641* (2013.01); *H04L 63/02* (2013.01); *H04L 67/1095* (2013.01); *G06F 2009/4557* (2013.01); *G06F 2009/45591* (2013.01)

(58) Field of Classification Search
CPC . H04L 12/4641; H04L 63/02; H04L 67/1095; H04L 67/1097; G06F 9/455; G06F 9/45533; G06F 2009/4557; G06F 2009/45591
See application file for complete search history.

(56) References Cited

U.S. PATENT DOCUMENTS

| | | |
|---|---|---|
| 7,721,138 B1 | 5/2010 | Lyadvinsky et al. |
| 7,937,612 B1 | 5/2011 | Lyadvinsky et al. |
| (Continued) | | |

FOREIGN PATENT DOCUMENTS

| | | |
|---|---|---|
| EP | 2306320 | 4/2011 |

*Primary Examiner* — Merilyn P Nguyen
(74) *Attorney, Agent, or Firm* — Anthony V. England; Andrew D. Wright; Roberts Calderon Safran & Cole, P.C.

(57) ABSTRACT

Methods and systems for datacenter migrations are disclosed. A method includes: virtualizing, by a computing device, servers in a source environment; installing, by the computing device, an isolation firewall to isolate a target environment from the source environment; installing, by the computing device, shared services in the target environment; installing, by the computing device, monitoring and management tools in the virtualized servers in the source environment; replicating, by the computing device, between the source environment and the target environment; and cutting over, by the computing device, from the source environment to the target environment by switching a route advertisement from the source datacenter to the target datacenter.

20 Claims, 4 Drawing Sheets

(56) References Cited

U.S. PATENT DOCUMENTS

| | | | |
|---|---|---|---|
| 8,069,435 B1* | 11/2011 | Lai | G06Q 30/06 717/106 |
| 8,498,997 B2 | 7/2013 | Murase | |
| 8,532,116 B2* | 9/2013 | Portolani | H04L 45/00 370/395.53 |
| 8,755,396 B2* | 6/2014 | Sindhu | H04L 49/505 370/412 |
| 8,819,672 B2 | 8/2014 | Joukov et al. | |
| 9,141,437 B2* | 9/2015 | Krishnamurthy | G06F 9/5088 |
| 9,166,988 B1* | 10/2015 | Shin | H04L 63/20 |
| 9,231,946 B2* | 1/2016 | Loo | H04L 67/02 |
| 9,276,871 B1 | 3/2016 | Freitas et al. | |
| 9,311,140 B2* | 4/2016 | Raghu | G06F 9/45558 |
| 9,438,531 B2 | 9/2016 | Freitas et al. | |
| 9,628,444 B1* | 4/2017 | Glazemakers | H04L 63/0236 |
| 9,699,001 B2* | 7/2017 | Addanki | H04L 12/4641 |
| 10,261,873 B2* | 4/2019 | Chandrashekar | H04L 41/0668 |
| 10,306,023 B2* | 5/2019 | Mokeev | H04L 67/42 |
| 10,659,523 B1* | 5/2020 | Joseph | H04L 63/0209 |
| 10,862,948 B1* | 12/2020 | Britt | H04L 41/0843 |
| 2003/0172145 A1* | 9/2003 | Nguyen | H04L 12/1403 709/223 |
| 2006/0010176 A1 | 1/2006 | Armington | |
| 2007/0006205 A1 | 1/2007 | Kennedy et al. | |
| 2007/0088630 A1 | 4/2007 | MacLeod et al. | |
| 2009/0210427 A1* | 8/2009 | Eidler | G06F 11/1484 |
| 2013/0290542 A1 | 10/2013 | Watt et al. | |
| 2014/0149591 A1 | 5/2014 | Bhattacharya et al. | |
| 2014/0169215 A1* | 6/2014 | Rajendran | H04L 49/70 370/254 |
| 2015/0052525 A1* | 2/2015 | Raghu | H04L 67/10 718/1 |
| 2015/0096011 A1 | 4/2015 | Watt | |
| 2015/0331708 A1 | 11/2015 | Bala et al. | |
| 2016/0092127 A1 | 3/2016 | Markley et al. | |
| 2018/0173549 A1* | 6/2018 | Browne | H04L 43/0817 |

* cited by examiner

BIG BANG APPROACH IN DATACENTER MIGRATIONS

BACKGROUND

The present invention generally relates to computing devices and, more particularly, to methods and systems for datacenter migrations.

Datacenter optimization, relocation, and consolidation are part of normal business transformation initiatives today. Projects involving datacenter relocations tend to be complex due to the types of workloads, the distributed nature of applications, and interdependencies amongst them. The complexity and risks in these projects translate into long cycles of discovery and analysis of the infrastructure, causing elongated project schedules and escalated costs for workload migrations. This is often unacceptable to businesses, particularly those that have lesser tolerances to even planned application downtime.

In datacenter relocation and cloud migration projects, systems (e.g., servers and applications) are migrated from source datacenters to target datacenters or clouds in groups referred to as waves. A wave typically comprises server images that have an application-level affinity amongst them necessitating migration in one grouping, at once, to avoid unintentional introduction of network latency between geographically separated servers that results in performance and availability degradation in production application infrastructure.

In order to plan and develop waves and move-groups (i.e., groups of independent waves that can be scheduled for migration within the same time windows), a combination of manual and automated methods are used to capture, examine, and validate application affinities. Automated discovery tools may be used to capture communication flows between the servers and map the dependencies and application affinity. Stakeholder interviews may be used to gather complementary information as well as validate the hypothesis generated from the analysis of application affinity.

This affinity-based approach requires both an investment in the tools as well as time for the analysis. The duration of the migration schedule is stretched out by introducing a large number of waves. The extended schedule may result in greater disruption to the business. For example, the rollout and configuration of discovery tools and capturing information from the environment may take anywhere between several weeks to a few months. Analysis of the reports and validation with business stakeholders requires additional time, extending the duration of the migration program.

SUMMARY

In a first aspect of the invention, there is a method that includes: virtualizing, by a computing device, servers in a source environment; installing, by the computing device, an isolation firewall to isolate a target environment from the source environment; installing, by the computing device, shared services in the target environment; installing, by the computing device, monitoring and management tools in the virtualized servers in the source environment; replicating, by the computing device, between the source environment and the target environment; and cutting over, by the computing device, from the source environment to the target environment by switching a route advertisement from the source datacenter to the target datacenter.

In another aspect of the invention, there is a computer program product that includes a computer readable storage medium having program instructions embodied therewith. The program instructions are executable by a computing device to cause the computing device to: move mutually chatting servers into a first virtual local area network (VLAN) in a source environment; virtualize the mutually chatting servers in the first VLAN in the source environment; install an isolation firewall to isolate a target environment from the source environment; install shared services in the target environment; install monitoring and management tools in the virtualized servers in the first VLAN in the source environment; replicate the virtualized servers in the first VLAN in the source environment to a second VLAN in the target environment; and cut over from the first VLAN in the source environment to the second VLAN in the target environment.

In another aspect of the invention, there is a system that includes: a hardware processor, a computer readable memory, and a computer readable storage medium associated with a computing device; program instructions of a source environment transformer configured to virtualize servers in a source environment; program instructions of an isolation firewall installer configured to install an isolation firewall to isolate a target environment from the source environment; program instructions of a service and tool installer configured to install shared services in the target environment and install monitoring and management tools in the virtualized servers in the source environment; program instructions of a storage replicator configured to replicate between the source environment and the target environment; and program instructions of a target environment starter configured to cut over from the source environment to the target environment, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
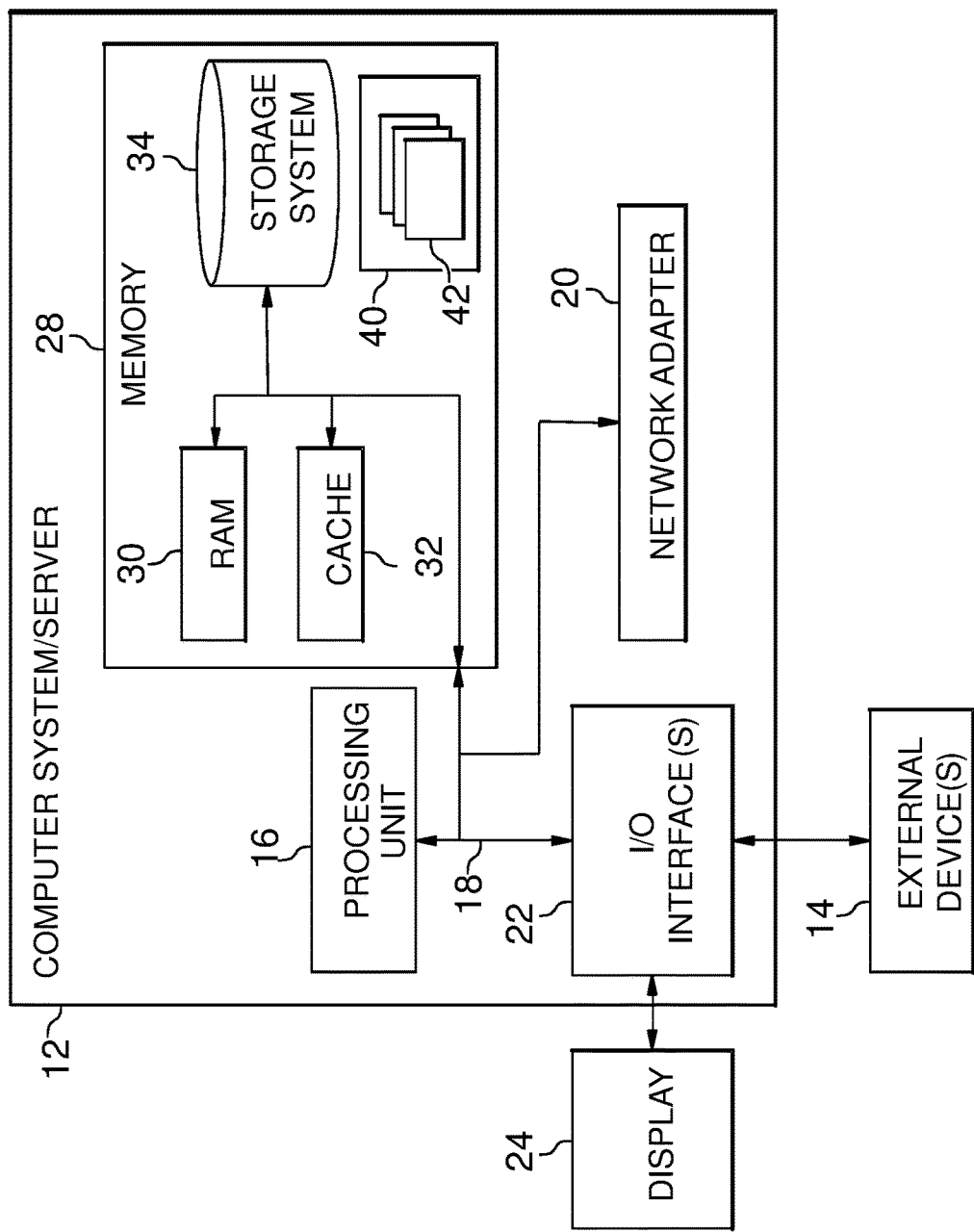
FIG. 1 depicts a computer system in accordance with aspects of the invention.

The present invention generally relates to computing devices and, more particularly, to methods and systems for datacenter migrations. Aspects of the invention provide a migration built around subnet/VLAN-based waves, obviating the need for extensive application affinity analysis, condensing the schedule into fewer waves, and reducing the risks and disruption to the business. Embodiments also reduce the costs of the migration program by condensing the duration. In the age of 24×7 e-commerce, there is a strong desirability for reduction of avoidable downtime and costs. Embodiments address this need by providing for the rapid relocation of workloads in condensed timeframes with little or no outages.

As described herein, aspects of the invention include a method and system for rapidly migrating a source environment in a big bang approach using large waves by transforming the source environment ahead of migration, installing an isolation firewall to segregate the target environment from the source environment, installing shared services in the target environment, installing monitoring and management tools on source server images, performing storage replication between the source and target datacenters, starting and testing the target environment, cutting over to the VLANs in the target environment in the target datacenter, and shutting down the corresponding application VLANs in the source environment in the source datacenter.

By migrating server images to target datacenters around subnet/VLAN boundaries, aspects of the invention provide for the migration of an entire subnet to the target datacenter at once. Each subnet/VLAN comprises all of the servers that have dependencies with each other. A subnet/VLAN-based migration schedule may contain a large number of servers, unlike traditional affinity-based waves. Additionally, building the target environment while source environment is still up and running facilitates a cutover with minimal or no downtime and reduces the risks, even providing for rollback with no loss of data or time for recovery.

Accordingly, embodiments improve the functioning of a computer by providing for improved datacenter migrations. In particular, embodiments facilitate the migration of larger waves compared to traditional affinity-based waves, allowing the overall migration schedule to be condensed to fewer move-events, thereby reducing the disruption to the business significantly. Additionally, embodiments avoid the need for complex application-level analysis as the entire environment is moved together. Migrations can be carried out even in cases where application knowledge is unavailable. Embodiments do not require subnet/VLAN extension from the source datacenter to the target datacenter. Finally, embodiments improve the functioning of a computer by avoiding unexpected application outages, improving customer satisfaction. Additionally, the system uses techniques that are, by definition, rooted in computer technology (e.g., virtualization and storage replication) that cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
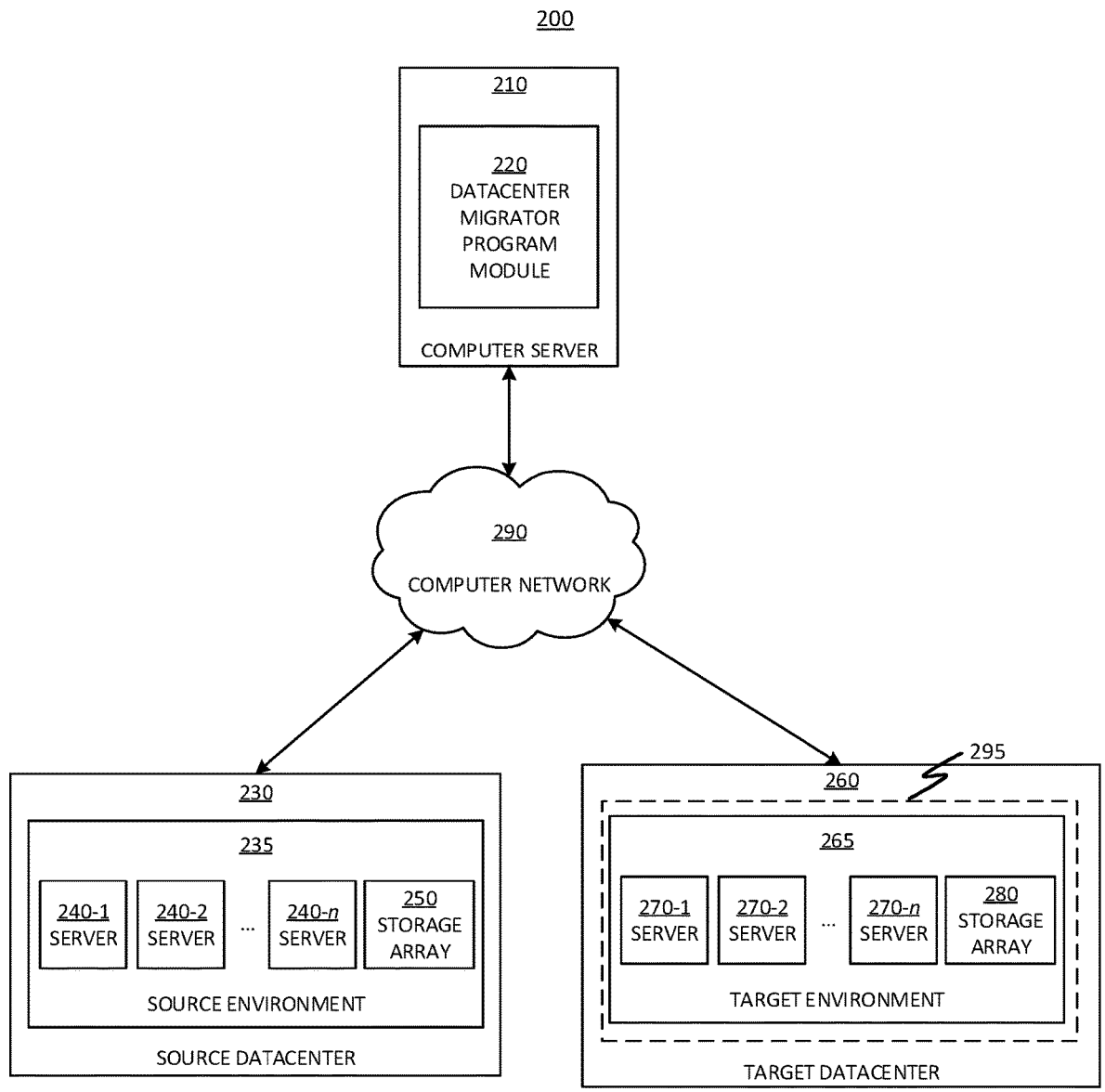
FIG. 2 depicts an illustrative environment in accordance with aspects of the invention.

FIG. 2 depicts an illustrative environment 200 in accordance with aspects of the invention. As shown, the environment 200 comprises a computer server 210 which is in communication with a source datacenter 230 (including servers 240-1, 240-2, . . . , 240-n and storage array 250 which compose the source datacenter 230) and a target datacenter 260 (including servers 270-1, 270-2, . . . , 270-n and storage array 280 which compose the target datacenter 260) via a computer network 290. The computer network 290 may be any suitable network such as a LAN, WAN, or the Internet. The computer server 210, the source datacenter 230 (including the servers 240-1, 240-2, . . . , 240-n and the storage array 250 which are in the source datacenter 230), and the target datacenter 260 (including the servers 270-1, 270-2, . . . , 270-n and the storage array 280 which are in the target datacenter 260) may be physically collocated, or may be situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 may be a computer server 12 as shown in FIG. 1. The computer server 210 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 may include a datacenter migrator program module 220, which may include hardware and/or software and may be one or more of the program modules 42 shown in FIG. 1. According to an embodiment, the datacenter migrator program module 220 includes program instructions for performing a migration of the source environment 235 in the source datacenter 230 to the target environment 265 in the target datacenter 260. The program instructions included in the datacenter migrator program module 220 of the computer server 210 may be executed by one or more hardware processors.

Still referring to FIG. 2, in embodiments, each of the servers 240-1, 240-2, . . . , 240-n and the servers 270-1, 270-2, . . . , 270-n may be a computer server 12 as shown in FIG. 1 or a virtual server. The servers 240-1, 240-2, . . . , 240-n may be members of a single VLAN in the source environment 235. The servers 270-1, 270-2, . . . , 270-n may be members of a single VLAN in the target environment 265. Each of the servers 240-1, 240-2, . . . , 240-n and the servers 270-1, 270-2, . . . , 270-n may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the storage array 250 in the source datacenter 230 and the storage array 280 in the target datacenter 260 may be one or more storage area networks (SANs), storage servers, network attached storage devices, or any other data storage devices or systems. Each of the storage array 250 in the source datacenter 230 and the storage array 280 in the target datacenter 260 may be a computer server 12 as shown in FIG. 1. Each of the storage array 250 in the source datacenter 230 and the storage array 280 in the target datacenter 260 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

Figure 3:
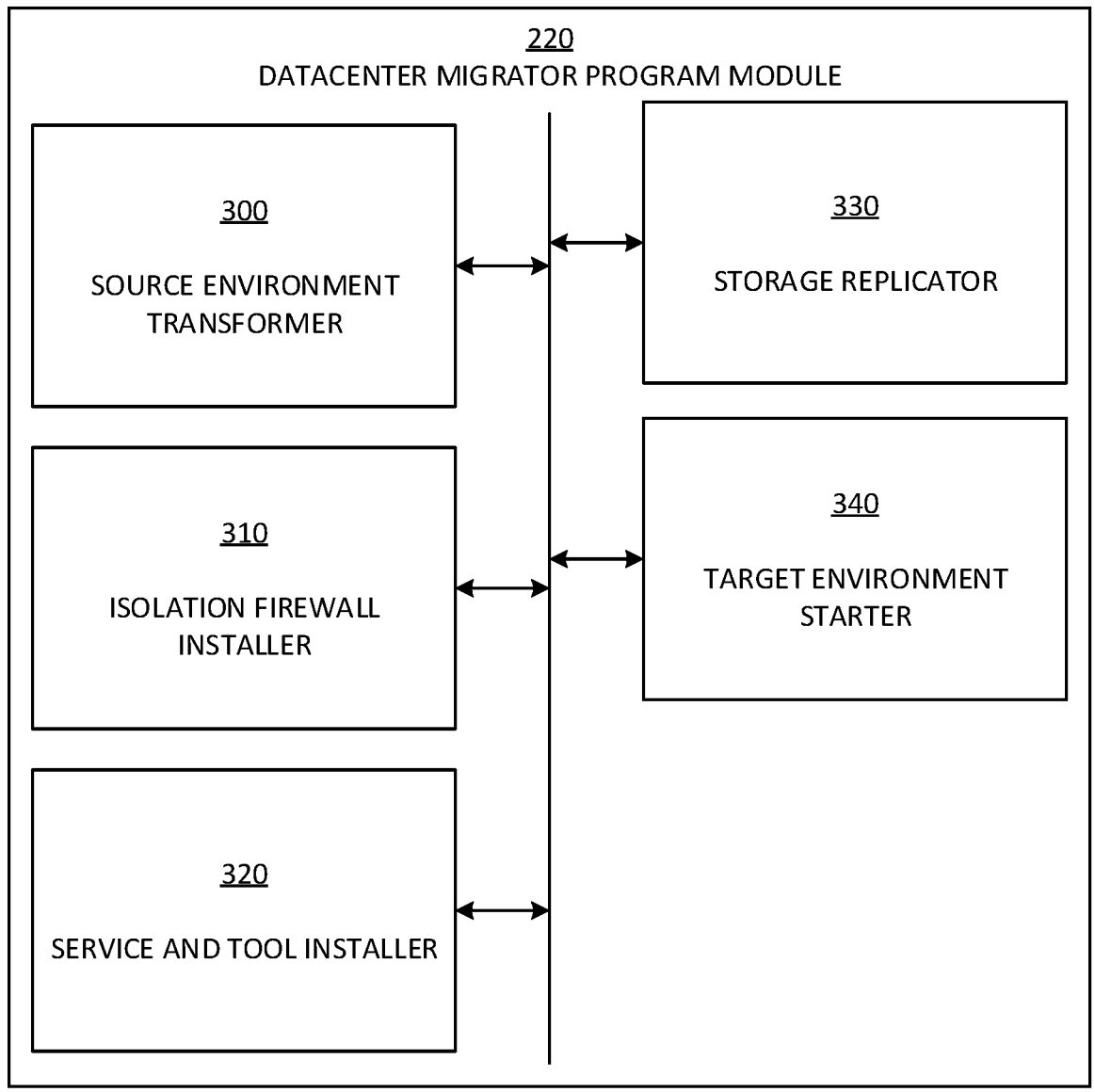
FIG. 3 depicts a block diagram of an exemplary program module in accordance with aspects of the invention.

FIG. 3 depicts a block diagram of an exemplary datacenter migrator program module 220 in the computer server 210 (of FIG. 2) in accordance with aspects of the invention. In embodiments, the datacenter migrator program module 220 includes a source environment transformer 300, an isolation firewall installer 310, a service and tool installer 320, a storage replicator 330, and a target environment starter 340, each of which may comprise one or more program modules 42 as described with respect to FIG. 1. In embodiments, the datacenter migrator program module 220 may include additional or fewer components than those shown in FIG. 3. In embodiments, separate components may be integrated into a single computing component or module. Additionally, or alternatively, a single component may be implemented as multiple computing components or modules.

In embodiments, in response to the datacenter migrator program module 220 receiving a request to migrate a source environment 235 in the source datacenter 230 to a target environment 265 in the target datacenter 260, the datacenter migrator program module 220 causes the source environment transformer 300 to transform the source environment 235 in the source datacenter 230. The source environment transformer 330 is configured to transform the source environment 235 in the source datacenter 230 by virtualizing the source environment 235 to the extent possible and moving all mutually chatting server images (e.g., server images that communicate with each other) into one VLAN or group of VLANs in the source environment 235.

In particular, the source environment transformer 330 is configured to transform any of the servers 240-1, 240-2, . . . , 240-n in the source environment 235 in the source datacenter 230 which are physical servers into virtual server images. The servers 240-1, 240-2, . . . , 240-n remain in change freeze during the migration process (e.g., until completion of the cutting over from the source environment 235 to the target environment 265) so the servers 240-1, 240-2, . . . , 240-n in the source environment 235 in the source datacenter 230 will remain identical to servers 270-1, 270-2, . . . , 270-n in the target environment 265 in the target datacenter 260.

To the extent that any of the servers 240-1, 240-2, . . . , 240-n in the source environment 235 in the source datacenter 230 must remain as physical servers, those particular servers are not eligible for the big bang migration approach and instead are moved using a host-based migration tooling approach or by the creation of a tarball (e.g., an archive file that includes multiple data files), etc., to move the image to the target environment 265 in the target datacenter 260 and stand it up in isolation (i.e., the physical server in the target environment 265 in the target datacenter 260 will remain running in isolation and data is replicated via storage until cutover).

Additionally, the source environment transformer 330 is configured to move all mutually chatting server images into one VLAN or group of VLANs comprising an environment (e.g., production, staging, development, and testing environments) to be migrated at once. In particular, if the servers 240-1, 240-2, ... , 240-n chat with any servers outside of the VLAN on which the servers 240-1, 240-2, ... , 240-n are located or group of VLANs comprising the environment, the source environment transformer 330 is configured to move those servers onto the same VLAN or group of VLANs as the servers 240-1, 240-2, ... , 240-n. For example, if servers in a development environment VLAN chat with a server in a staging environment VLAN, the source environment transformer 330 would move that server from the staging environment VLAN to the development environment VLAN. As another example, the source environment 235 may be a development environment, and the source environment transformer 330 may consolidate all mutually chatting server images in the development environment into a group of five VLANs to be migrated at once.

Still referring to FIG. 3, in embodiments, the isolation firewall installer 310 is configured to install an isolation firewall 295 to segregate the target environment 265 in the target datacenter 260 from the source environment 235 in the source datacenter 230. In particular, the isolation firewall installer 310 may use software-defined networking (SDN) to install and configure the isolation firewall 295 to block access and egress to VLANs in the target environment 265. The isolation firewall 295 may be configured so that the servers 270-1, 270-2, ... , 270-n are isolated from (e.g., unable to communicate with) the servers 240-1, 240-2, ... , 240-n.

In embodiments, the service and tool installer 320 is configured to install shared services in the target environment 265 in the target datacenter 260. In particular, the service and tool installer 320 may install and configure shared services such as an active directory structure, security appliances, and other services that are common across the entire enterprise and that are built out in the target environment 265 in the target datacenter 260 rather than migrated from the source environment 235 in the source datacenter 230.

Additionally, the service and tool installer 320 is configured to install monitoring and management tools of the Future Mode of Operations environment (e.g., the target environment 265) on the virtual server images for the servers 240-1, 240-2, ... , 240-n. In particular, the service and tool installer 320 may install, on the server images, tools used to monitor and manage the target environment 265 in the target datacenter 260. These tools may include systems management tools, patch management tools, antivirus tools, and any other tools that will be used in the target environment 265 in the target datacenter 260.

Still referring to FIG. 3, in embodiments, the storage replicator 330 initiates storage replication between the source datacenter 230 and the target datacenter 260. In particular, the storage replicator 330 copies each of the virtual server images in each of the VLANs to be migrated, including virtual server images of the servers 240-1, 240-2, ... , 240-n, from the source datacenter 230 to the target datacenter 260. For example, the storage replicator 330 may copy virtual server images of the servers 240-1, 240-2, ... , 240-n in the development VLAN from the source environment 235 in the source datacenter 230 to the target environment 265 in the target datacenter 260 to create servers 270-1, 270-2, ... , 270-n.

Additionally, in embodiments, the storage replicator 330 replicates the storage array 250 in the source environment 235 in the source datacenter 230 to the storage array 280 in the target environment 265 in the target datacenter 260. For example, the storage replicator 330 may use SAN-to-SAN replication to replicate the storage array 250 in the source environment 235 in the source datacenter 230 to the storage array 280 in the target environment 265 in the target datacenter 260.

Still referring to FIG. 3, in embodiments, the target environment starter 340 turns up (e.g., tests and activates) the replicated application environment (i.e., the target environment 265 in the target datacenter 260) once the storage replicator 330 has finished copying over all of the virtual server images in all of the VLANs that are being migrated from the source environment 235 in the source datacenter 230 to the target environment 265 in the target datacenter 260 and finished replicating the storage array 250 in the source datacenter 230 to the storage array 280 in the target datacenter 260.

In particular, the target environment starter 340 spins up (e.g., activates) the servers 270-1, 270-2, ... , 270-n in the target datacenter 260 and adjusts the virtual server images of the servers 270-1, 270-2, ... , 270-n by using automated scripts to uninstall Current Mode of Operations tools (e.g., tools associated with the source environment 235) and start Future Mode of Operations tools (e.g., tools associated with the target environment 265) that were previously installed by the service and tool installer 320.

The target environment starter 340 may then start the target environment 265 in the target datacenter 260 and test the target environment 265 within the isolated zone created by the isolation firewall 295 previously installed by the isolation firewall installer 310. The testing may include risk-based testing in which aspects of the environment that were changed during the migration are tested. Optionally, an end-to-end test may be performed for an application.

Finally, upon successful testing and validation of the target environment 265, the target environment starter 340 may take down the isolation firewall 295 installed by the isolation firewall installer 310, cutover to the VLANs in the target datacenter 260 (e.g., the VLAN including the servers 270-1, 270-2, ... , 270-n) by advertising routes from the target environment 265 in the target datacenter 260, and decommission (e.g., shutdown) the corresponding VLANs in the source datacenter 230 (e.g., the VLAN including the servers 240-1, 240-2, ... , 240-n). According to an embodiment, a period of hypercare (e.g., two to three days) may precede the decommissioning of the VLANs in the source datacenter 230.

Figure 4:
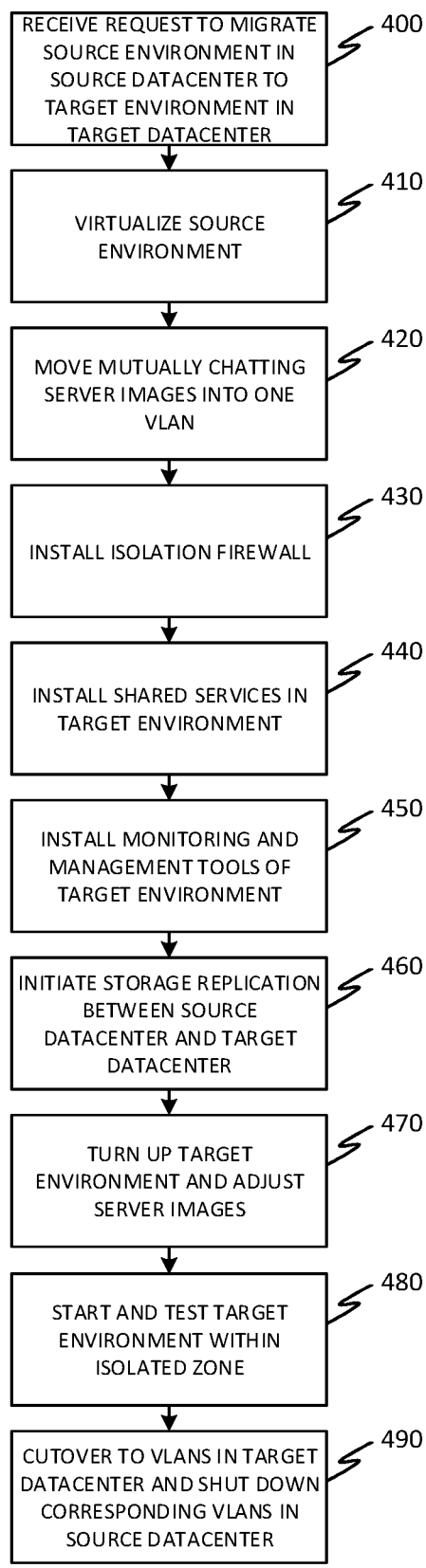
FIG. 4 depicts a flowchart of an exemplary method in accordance with aspects of the invention.

FIG. 4 depicts a flowchart of an exemplary method in accordance with aspects of the invention. The steps of the method may be performed in the environment of FIG. 2 and are described with reference to the elements and steps described with respect to FIGS. 1, 2, and 3.

At step 400, the system receives a request to migrate a source environment 235 in the source datacenter 230 to a target environment 265 in the target datacenter 260. In embodiments, as described with respect to FIG. 3, step 400 comprises the datacenter migrator program module 220 receiving the request from a user or from another program module or application.

At step 410, the system virtualizes the source environment 235. In embodiments, as described with respect to FIG. 3, step 410 comprises the source environment transformer 300 transforming any of the servers 240-1, 240-2, . . . , 240-$n$ which are physical servers into virtual server images.

At step 420, the system moves mutually chatting server images into one VLAN or group of VLANs. In embodiments, as described with respect to FIG. 3, step 420 comprises the source environment transformer 330 identifying any servers outside of the VLAN on which the servers 240-1, 240-2, . . . , 240-$n$ are located that chat with the servers 240-1, 240-2, . . . , 240-$n$, and moving those servers onto the same VLAN or group of VLANs as the servers 240-1, 240-2, . . . , 240-$n$.

At step 430, the system installs an isolation firewall 295. In embodiments, as described with respect to FIG. 3, step 430 comprises the isolation firewall installer 310 installing the isolation firewall 295 to segregate the target environment 265 in the target datacenter 260 from the source environment 235 in the source datacenter 230. The isolation firewall installer 310 may use software-defined networking (SDN) to install the isolation firewall 295. The isolation firewall 295 may be configured so that the servers 270-1, 270-2, . . . , 270-$n$ are isolated from (e.g., unable to communicate with) the servers 240-1, 240-2, . . . , 240-$n$.

At step 440, the system installs shared services in the target environment 265. In embodiments, as described with respect to FIG. 3, step 440 comprises the service and tool installer 320 installing and configuring shared services in the target datacenter 260, such as an active directory structure, security appliances, and other services that are common across the entire enterprise.

At step 450, the system installs monitoring and management tools of the target environment 265. In embodiments, as described with respect to FIG. 3, step 450 comprises the service and tool installer 320 installing, on the images for the servers 240-1, 240-2, . . . , 240-$n$, tools used to monitor and manage the environment in the target environment 265 in the target datacenter 260. These tools may include systems management tools, patch management tools, antivirus tools, and any other tools that will be used in the target environment 265 in the target datacenter 260.

At step 460, the system initiates storage replication between the source datacenter 230 and the target datacenter 260. In embodiments, as described with respect to FIG. 3, step 460 comprises the storage replicator 330 copying each of the images in each of the VLANs to be migrated, including images of the servers 240-1, 240-2, . . . , 240-$n$, from the source datacenter 230 to the target datacenter 260.

At step 470, the system turns up the target environment 265 and adjusts the virtual server images of the servers 270-1, 270-2, . . . , 270-$n$. In embodiments, as described with respect to FIG. 3, step 470 comprises, upon completion of the replication at step 460 of the virtual server images in all of the VLANs that are being migrated from the source environment 235 in the source datacenter 230 to the target environment 265 in the target datacenter 260, the target environment starter 340 turning up the target environment 265 in the target datacenter 260. In particular, the target environment starter 340 spins up the servers 270-1, 270-2, . . . , 270-$n$ and adjusts the virtual server images of the servers 270-1, 270-2, . . . , 270-$n$ by using automated scripts to uninstall Current Mode of Operations tools and start Future Mode of Operations tools that were previously installed by the service and tool installer 320.

At step 480, the system starts the target environment 265 and tests the target environment 265 within the isolated zone. In embodiments, step 480 comprises the target environment starter 340 starting the target environment 265 in the target datacenter 260 and testing the target environment 265 within the isolated zone created by the isolation firewall 295 previously installed by the isolation firewall installer 310. The testing may include risk-based testing in which aspects of the environment that were changed during the migration are tested. Optionally, an end-to-end test may be performed.

At step 490, the system cuts over to the VLANs in the target datacenter 260 and shuts down the corresponding VLANs in the source datacenter 230. In embodiments, step 490 comprises, upon successful completion of the testing at step 480, the target environment starter 340 taking down the isolation firewall 295 installed by the isolation firewall installer 310, cutting over to the migrated VLANs in the target environment 265 in the target datacenter 260 (e.g., the VLAN including the servers 270-1, 270-2, . . . , 270-$n$) by advertising routes from the target environment 265 in the target datacenter 260, and decommissioning (e.g., shutdown) the corresponding VLANs in the source environment 235 in the source datacenter 230 (e.g., the VLAN including the servers 240-1, 240-2, . . . , 240-$n$). In particular, the advertising routes may include turning down the route advertisement from the source datacenter 230 and switching the route advertisement to the target datacenter 260.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, a request to migrate a source environment in a source datacenter to a target environment in a target datacenter;
virtualizing, by the computing device and in response to the request, servers in the source environment;
installing, by the computing device, an isolation firewall to isolate the target environment from the source environment;
installing, by the computing device, shared services in the target environment;
installing, by the computing device, monitoring and management tools in the virtualized servers in the source environment;
replicating, by the computing device, between the source environment and the target environment; and
cutting over, by the computing device, from the source environment to the target environment.

2. The method according to claim 1, wherein the servers comprise an entire subnet that is migrated to the target environment in the target datacenter at once.

3. The method according to claim 1, wherein the virtualizing the servers in the source environment comprises converting physical server images into virtual server images.

4. The method according to claim 3, wherein the servers remain in change freeze until completion of the cutting over from the source environment to the target environment.

5. The method according to claim 3, further comprising moving all mutually chatting server images into one or more associated virtual local area networks (VLANs).

6. The method according to claim 1, wherein the installing the isolation firewall comprises configuring the isolation firewall to block access and egress to virtual local area networks (VLANs) in the target environment.

7. The method according to claim 1, wherein the monitoring and management tools comprise tools associated with the target environment.

8. The method according to claim 1, wherein the replicating between the source environment and the target environment comprises replicating the virtualized servers from the source environment to the target environment.

9. The method according to claim 8, wherein the replicating between the source environment and the target environment further comprises replicating a storage array in the source environment to a storage array in the target environment.

10. The method according to claim 1, wherein the cutting over from the source environment to the target environment comprises:
adjusting images of the virtualized servers in the target environment by using automated scripts to uninstall tools associated with the source environment and start tools associated with the target environment;
starting and testing the target environment;
advertising routes from the target environment; and
decommissioning the source environment.

11. A computer program product comprising a computer readable storage medium having program instructions embodied therewith, the program instructions executable by a computing device to cause the computing device to:
move mutually chatting servers into a first virtual local area network (VLAN) in a source environment;
virtualize the mutually chatting servers in the first VLAN in the source environment;
install an isolation firewall to isolate a target environment from the source environment;
install shared services in the target environment;
install monitoring and management tools in the virtualized servers in the first VLAN in the source environment;
replicate the virtualized servers in the first VLAN in the source environment to a second VLAN in the target environment; and
cut over from the first VLAN in the source environment to the second VLAN in the target environment.

12. The computer program product according to claim 11, wherein the virtualizing the mutually chatting servers comprises converting physical server images into virtual server images.

13. The computer program product according to claim 12, wherein the mutually chatting servers remain in change freeze until completion of the cut over from the first VLAN in the source environment to the second VLAN in the target environment.

14. The computer program product according to claim 11, wherein the installing the isolation firewall comprises using software defined networking to install and configure the isolation firewall to block access and egress to the second VLAN.

15. The computer program product according to claim 11, wherein the monitoring and management tools comprise tools of the target environment.

16. The computer program product according to claim 11, wherein the replicating the virtualized servers in the first VLAN in the source environment to the second VLAN in the target environment further comprises replicating a storage array in the first VLAN in the source environment to a storage array in the second VLAN in the target environment.

17. The computer program product according to claim 11, wherein the cut over from the first VLAN in the source environment to the second VLAN in the target environment comprises:
adjusting images of the virtualized servers in the second VLAN in the target environment by using automated scripts to uninstall tools of the source environment and start tools of the target environment;
starting and testing the target environment;
advertising routes from the second VLAN in the target environment; and
decommissioning the first VLAN in the source environment.

18. A system comprising:
a hardware processor, a computer readable memory, and a computer readable storage medium associated with a computing device;
program instructions of a source environment transformer configured to virtualize servers in a source environment;
program instructions of an isolation firewall installer configured to install an isolation firewall to isolate a target environment from the source environment;
program instructions of a service and tool installer configured to install shared services in the target environment and install monitoring and management tools in the virtualized servers in the source environment;
program instructions of a storage replicator configured to replicate between the source environment and the target environment; and program instructions of a target environment starter configured to cut over from the source environment to the target environment, wherein the target environment starter is configured to adjust images of the virtualized servers in the target environment by using automated scripts to uninstall tools of the source environment and start tools of the target environment, wherein the program instructions are stored on the computer readable storage medium for execution by the hardware processor via the computer readable memory.

19. The system according to claim 18, wherein the source environment transformer is configured to the virtualize the servers in the source environment by converting physical server images into virtual server images.

20. The system according to claim 18, wherein the target environment starter is further configured to:
   start and test the target environment;
   advertise routes from the target environment; and
   decommission the source environment.

* * * * *